No. 715,231. Patented Dec. 2, 1902.
W. A. CROWDUS.
BRAKE.
(Application filed July 18, 1901.)
(No Model.)
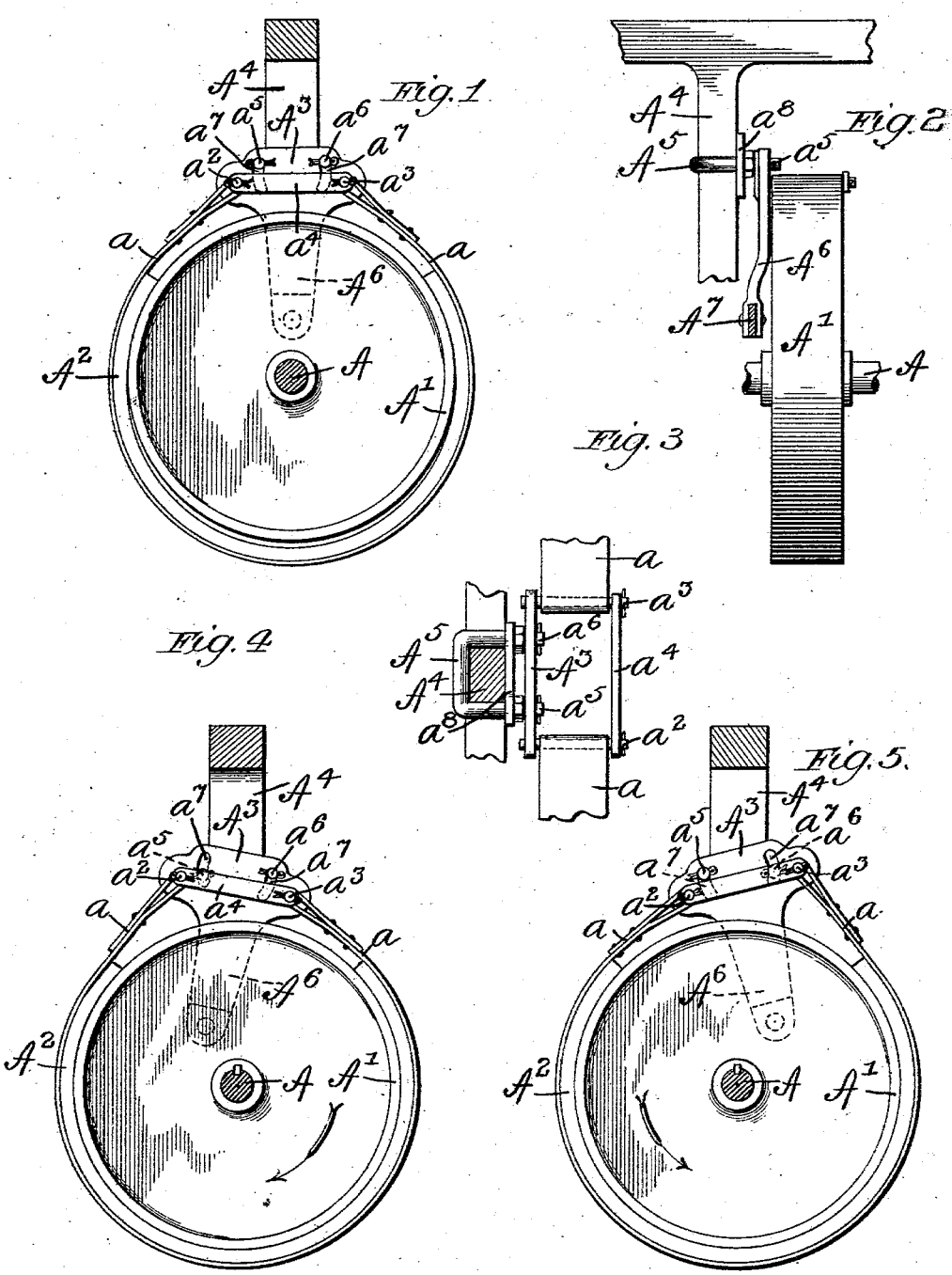
Witnesses:
Harold G. Barrett.
Edw. Barrett.
Inventor
Walter A. Crowdus
By Jno. E. Waldo,
Atty.

UNITED STATES PATENT OFFICE.

WALTER A. CROWDUS, OF CHICAGO, ILLINOIS.

BRAKE.

SPECIFICATION forming part of Letters Patent No. 715,231, dated December 2, 1902.

Application filed July 18, 1901. Serial No. 68,763. (No model.)

*To all whom it may concern:*

Be it known that I, WALTER A. CROWDUS, a citizen of the United States, and a resident of Chicago, in the county of Cook and State of Illinois, have invented an Improved Brake, of which the following is a specification.

This invention relates to brakes, and relates particularly to band-brakes.

A primary object of the invention is to provide a brake primarily designed and adapted for use on motor-vehicles, whereby the shaft or axle to which it is applied may be effectively "braked" when rotating in either direction, thus making provision for stopping the vehicle when going in either direction, either ahead or backward. My improved brake is, however, equally adapted for braking any shaft designed to rotate in opposite directions.

The invention consists of the various features, combinations of features, and details of construction hereinafter described and claimed.

In the accompanying drawings a brake of my invention is fully illustrated.

Figure 1 is a side view of a brake of my invention, showing the parts in normal position—that is, the brake being released. Fig. 2 is an end view thereof. Fig. 3 is a partial top plan view thereof, and Figs. 4 and 5 are views showing the relation and position of parts for braking the shaft or axle when rotating in opposite directions.

Referring now to the drawings, A designates a revoluble shaft, as the axle of a motor-vehicle, A' a brake-drum secured to said shaft or axle, and $A^2$ a brake-band applied to the brake-drum A'. All of the foregoing elements are old and well known in the art and may be of any usual or approved construction.

The ends of the strap $a$ of the brake-band $A^2$ are anchored or secured to a link $A^3$, supported so as to admit of oscillatory movement, so that either end thereof may be raised, as desired. In the specific construction shown the ends of the strap $a$ are attached to pins or studs $a^2 a^3$, rigidly secured in said link $A^3$, and the ends of said pins $a^2 a^3$ outside of said band $A^2$ are connected by a link $a^4$, which will operate in an obvious manner to relieve said pins from a large part of the strain due to applying said brake. In the preferable construction shown the link $A^3$ is supported upon a rigid arm $A^4$, which extends in desired proximity to the brake-drum A', said link being preferably connected to said arm $A^4$, so as to provide for desired oscillation thereof in the following manner: Projecting from the arm $A^4$ are pins or studs $a^5 a^6$, which extend through slots $a^7$, formed in said link $A^3$. As shown, the slots $a^7$ are circular and are described from the centers of the pins or studs $a^5 a^6$ when said pins are at the upper ends of said slots, as shown in Fig. 1. In the preferable construction shown, also, the pins $a^5 a^6$ are disposed between the pins $a^2 a^3$. In the specific construction shown the pins or studs $a^5 a^6$ are formed by the ends of a U-shaped member $A^5$, which embraces the arm $A^4$ and is clamped thereto by means of nuts threaded thereto outside of a plate or bar $a^8$, which bears against said arm $A^4$. I do not desire, however, to be limited to the specific construction shown, as my invention contemplates equally securing said pins or studs directly in said arm $A^4$ or otherwise rigidly securing them thereto.

The link $A^3$ is designed to be oscillated or moved pivotally by suitable means, which, as shown, consist of a lever-arm $A^6$, preferably formed integral therewith. With the described construction it is obvious that a strain on said lever-arm $A^6$ in either direction will operate to impart movement to said link $A^3$ about one or the other of the pins or studs $a^5 a^6$ as a fulcrum, the end of said link $A^3$ remote from the pin or stud which acts as a fulcrum in any case being raised. The movement of said lever-arm $A^6$ and of said link $A^3$ being sufficient, it is obvious that the brake-band $A^2$ will thereby be drawn into engagement with the brake-drum A' and will be caused to grip the same. In the specific construction shown, also, the pins $a^5 a^6$ being intermediate to pins $a^2 a^3$ it is also obvious that the end of said link proximate to the pin or stud $a^5 a^6$, which acts as a fulcrum in a given case, will be depressed by the oscillation or pivotal movement of said link $A^3$. Normally the link $A^3$ and the brake-band $A^2$ are in the position shown in Fig. 1, the brake being released in this position. When it is desired to stop the shaft rotating in the direction indicated in Fig. 4, the lever-arm $A^6$ is moved into the position shown in Fig. 4. This, as heretofore described, will obviously operate to raise the pin $a^2$ about the stud or pin $a^5$ as a fulcrum and at the same time to slightly depress the pin $a^3$. Thus the movement of said lever being sufficient, it will cause said brake-band $A^2$ to grip the brake-drum $A'$ in such manner as to most effectively apply the brake. On the other hand, when it is desired to stop the shaft rotating in the direction shown in Fig. 5 the lever $A^6$ is moved into the position shown in Fig. 5, which will obviously operate to raise the pin $a^3$ about the pin or stud $a^5$ as a fulcrum and at the same time to slightly depress the pin $a^2$, which will operate to most effectively apply the band to the drum $A'$ according to the familiar principle of operation of a band-brake.

As shown, the lever-arm $A^6$ is designed to be operated by a hand-lever (not shown) and connected thereto by a link $A^7$; but the invention contemplates equally applying the brake by any other suitable means.

I claim—

1. The combination with a revoluble shaft, of a drum secured thereto, a brake-band applied to said drum, a link to which the ends of said brake-band are attached, a support, pins or studs which project therefrom and which extend through slots in said link, said link being pivotally movable about either of said pins or studs as a center and a lever applied to said link and adapted to impart positive pivotal movement to said link about either of said pins or studs as a center, substantially as described.

2. The combination with a revoluble shaft, of a drum secured thereto, a brake-band applied to said drum, a link to which the ends of said brake-band are attached, a support, pins or studs which project from said support and which extend through slots in said link, said slots being circular each from the other pin or stud as a center and a lever applied to said link whereby positive pivotal movement may be imparted to said link about either of said pins or studs as a center as desired, substantially as described.

3. The combination with a revoluble shaft or axle, of a drum secured thereto, a brake-band applied to said drum, a link to which the ends of said brake-band are attached, a support, pins or studs which project therefrom and which extend through slots in said link, said link being pivotally movable about either of said pins or studs as a center and a lever-arm on said link whereby pivotal movement may be imparted to said link about either of said pins or studs as a center as desired, substantially as described.

4. The combination with a revoluble shaft, of a drum secured thereto, a brake-band applied to said drum, a link, pins or studs secured therein to which the ends of said brake-band are attached, a link or bar which connects said pins or studs outside of said brake-band, a support, pins or studs which project therefrom and which extend through slots in said first-mentioned link and a lever applied to said first-mentioned link whereby pivotal movement may be imparted to said link about either of said supporting pins or studs as a center as desired, substantially as described.

In testimony that I claim the foregoing as my invention I affix my signature, in presence of two subscribing witnesses, this 5th day of July, A. D. 1901.

WALTER A. CROWDUS.

Witnesses:
N. W. SOMERVILLE,
JOHN A. McKEOWN.